(12) United States Patent
Rehfuss et al.

(10) Patent No.: US 6,420,472 B1
(45) Date of Patent: *Jul. 16, 2002

(54) CURABLE COATING COMPOSITIONS HAVING IMPROVED EFFECT PIGMENT ORIENTATION AND A METHOD USING THE SAME

(75) Inventors: John W. Rehfuss, West Bloomfield; Marvin L. Green, Brighton; Bertrum Miller, Roseville, all of MI (US)

(73) Assignee: BASF Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,479

(22) Filed: May 12, 2000

Related U.S. Application Data

(60) Division of application No. 08/980,545, filed on Dec. 1, 1997, now Pat. No. 6,117,931, which is a continuation-in-part of application No. 08/673,936, filed on Jul. 1, 1996, now Pat. No. 5,693,723, and a continuation-in-part of application No. 08/673,937, filed on Jul. 1, 1996, now Pat. No. 5,693,724.

(51) Int. Cl.$^7$ .................. C08K 3/08; C08K 3/34; C08G 8/28; C08G 59/14
(52) U.S. Cl. ............. 524/441; 524/449; 524/439; 525/456; 525/440; 525/441; 525/509; 525/481; 525/488; 525/510; 525/514; 523/457; 523/466
(58) Field of Search ................. 524/441, 449, 524/439; 523/457, 466; 525/456, 440, 441, 509, 481, 488, 510, 514

(56) References Cited

U.S. PATENT DOCUMENTS

| | | | |
|---|---|---|---|
| 5,612,095 A | 3/1997 | Brock et al. ............. 427/407.1 |
| 5,614,584 A | 3/1997 | Schwan et al. .............. 524/591 |
| 5,614,590 A | 3/1997 | Bederke et al. ............. 525/127 |
| 5,618,343 A | 4/1997 | Hendi et al. ................. 106/498 |
| 5,626,661 A | 5/1997 | Schmid et al. .............. 406/415 |
| 5,626,917 A | 5/1997 | Brock et al. .............. 427/407.1 |
| 5,633,037 A | 5/1997 | Mayer ........................ 427/140 |
| 5,635,564 A | 6/1997 | Wieditz et al. .............. 525/194 |
| 5,852,136 A | * 12/1998 | Green .......................... 525/481 |
| 5,872,195 A | * 2/1999 | Green et al. ................. 525/481 |
| 5,994,479 A | * 11/1999 | Green et al. ................. 525/481 |
| 6,117,931 A | * 9/2000 | Rehfuss et al. ............. 524/441 |

OTHER PUBLICATIONS

Published by the Oil & Colour Chemicals' Association, Dr. Robert M. Christie, entitled "Pigment Structures and Synthetic Procedures", 1993, pp. 1, and 30–31.

* cited by examiner

*Primary Examiner*—Donald R. Wilson
(74) *Attorney, Agent, or Firm*—Mary E. Golota

(57) ABSTRACT

There is described a curable coating composition having at least one effect pigment which, upon cure, exhibits substantially improved orientation of the effect pigment and a corresponding improvement in appearance. The composition comprises:

(A) a carbamate-functional component having a hydrophobicity equivalent to or greater than that of a carbamate-functional compound (A') which is the reaction product of:
(1) a compound comprising a plurality of hydroxyl groups, at least one of which is the result of a ring-opening reaction between an epoxy group and an organic acid group, and
(2) cyanic acid or a compound comprising a carbamate group, and
(B) a component comprising a plurality of groups that are reactive with the carbamate functional groups on component (A), and
(C) at least one effect pigment, the curable coating composition when cured having a substantially improved effect pigment orientation. Preferably, the composition further comprises particular rheology control agents.

13 Claims, No Drawings

CURABLE COATING COMPOSITIONS HAVING IMPROVED EFFECT PIGMENT ORIENTATION AND A METHOD USING THE SAME

FIELD OF THE INVENTION

This application is a divisional of application Ser. No. 08/980,545, Dec. 1, 1997, now U.S. Pat. No. 6,117,931, which is a continuation-in-part of application Ser. No. 08/673,936, Jul. 1, 1996, now U.S. Pat. No. 5,693,723, and a continuation-part of application Ser. No. 08/673,337, Jul. 1, 1996 now U.S. Pat. No. 5,693,724.

BACKGROUND OF THE INVENTION

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect.

High-gloss coatings also require a low degree of visual aberrations at the surface of the coating in order to achieve the desired visual effect such as high distinctness of image (DOI).

Such coatings are especially susceptible to a phenomenon known as environmental etch. Environmental etch manifests itself as spots or marks on or in the finish of the coating that often cannot be easily rubbed out.

It is also often desirable to provide options of different types of carbamate-functional materials to provide coatings with a good combination of properties such as durability, hardness, flexibility, and resistance to scratching, marring, solvents, and acids.

Curable coating compositions based on curable components having carbamate functionality have been described in the art to provide etch-resistant coatings, e.g., U.S. Pat. No. 5,356,669 and WO 94/10211. Non-polymeric carbamate-functional compounds for coating compositions have been described in U.S. Pat. No. 5,336,566 and EP 636,660.

In order to obtain the smooth finishes that are often highly desirable in the coatings industry, coating compositions preferably tend to be fluid in nature, and to exhibit good flow. Good flow is observed when the coating composition is fluid enough at some point after it is applied to the substrate and before it cures to a hard film so that the surface of the coating takes on a smooth appearance. Some coating compositions exhibit good flow immediately upon application and others exhibit good flow when heated. One way to impart fluid characteristics and good flow to a coating composition is to incorporate volatile organic solvents into the compositions. These solvents can provide the desired fluidity and flow during the coating process, after which they evaporate, leaving only the coating components behind. However, the use of such solvents also increases the volatile organic content (VOC) of the coating composition. Because of the adverse impact VOC has on the environment, many government regulations impose limitations on the amount of solvent that can be used. It would thus be desirable to utilize coating composition components that provide good fluidity and flow to the coating composition without the need for large amounts of solvent.

Because of their other beneficial properties, it would also be desirable to provide carbamate-functional compounds for use in coating compositions that do not require large quantities of solvent.

It is often desirable that such coating compositions incorporate one or more pigments. Pigments may be used to provide a variety of appearance and/or performance characteristics. For example, it is often advantageous that a coating composition provide a sparkle, pearlescent, luminescent, and/or metallic appearance or an increased depth of color. Such characteristics and/or appearances can often be achieved with the use of one or more effect pigments as defined below.

The quality of the appearance achieved with the use of one or more effect pigments is often dependent upon the orientation of the individual effect pigment particles. For example, it is generally believed that optimal appearance of a metallic pigment such as aluminum is obtained when the individual aluminum flakes are positioned to lay parallel or flat to the coating surface.

Improved or desirable orientation of effect pigments in a cured coating composition may be manifested as the degree of change in lightness values as a function of the viewing and/or illuminating geometry. Users of coatings containing one or more effect pigments, especially metallic coatings, typically require a degree of change as large as possible. This is particularly so for metallic coating compositions intended for use in the automotive market. Such coatings are said to have good "travel", that is, the perceived lightness of a cured coated panel viewed at a first angle is significantly different from the perceived lightness of that same panel viewed at a second angle some distance from the first angle. This may also be characterized as flop per ASTM E-284-96. In either case, a significant difference in appearance between the two viewing angles is desireable.

Good travel is generally believed to be observed when the effect pigment particles have a uniform parallel orientation to the surface of the coating or substrate.

Control of effect pigment orientation has long presented a challenge to those skilled in the art. This is particularly true for topcoat technologies utilizing basecoat/clearcoat and/or wet on wet applications. Effect pigment particle orientation in a basecoat is often susceptible to disordering by the application of a clearcoat, especially if a wet on wet application is employed. Destabilization of pigments during the manufacture of a curable coating composition can also result in negative appearance and performance properties such as loss of hiding and decreased metallic effect if the effect pigment is a metallic pigment. Disordering and/or destabilization often manifest as floculation and/or agglomeration of the effect pigment. Effect pigment orientation, especially that of metallic pigments such as aluminum, has been particularly difficult to control in solvent borne coatings, especially high solids solvent borne coatings.

Thus, it would be desirable to provide curable coating compositions possessing the foregoing advantages as well as improved control over the orientation and/or appearance of effect pigments, especially metallic pigments. Such compositions would be particularly useful as topcoats alone or in conjunction with a clearcoat.

SUMMARY OF THE INVENTION

According to the present invention, there is provided a curable coating composition having improved effect pigment orientation, the composition comprising:

(A) a carbamate-functional component having a hydrophobicity equivalent to or greater than that of a carbamate-functional compound (A') which is the reaction product of:
(1) a compound comprising a plurality of hydroxyl groups, at least one of which is the result of a ring-opening reaction between an epoxy group and an organic acid group, and
(2) cyanic acid or a compound comprising a carbamate group, and
(B) a component comprising a plurality of groups that are reactive with the carbamate functional groups on component (A), and
(C) at least one effect pigment, the curable coating composition when cured having a substantially improved effect pigment orientation. Preferably, the compositions of the invention also comprise one or more rheology control agents such as microgels, especially nonaqueous dispersions of microgels.

The invention also provides methods for obtaining coated surfaces having improved effect pigment orientation and appearance, comprising providing at least one effect pigment,
providing a carbamate-functional component (A) having a hydrophobicity equivalent to or greater than that of a carbamate-functional compound (A')which is the reaction product of:
(1) a compound comprising a plurality of hydroxyl groups, at least one of which is the result of a ring-opening reaction between an epoxy group of a compound (a) and an organic acid group of a. compound (b), and
(2) cyanic acid or a compound comprising a carbamate group,
providing a component (B) comprising a plurality of groups that are reactive with the carbamate functional groups on component (A)
mixing components (A), (B) and (C) so as to provide a curable coating composition (I),
coating a surface with the curable coating composition (I), and
exposing the coated surface to heat for a time sufficient to cure the coating composition (I) to provide a cured coated surface having improved effect pigment orientation.

The method and curable coatings compositions of the invention provide measurable and unexpected improvement with respect to the orientation of at least one effect pigment. In particular, the substantially improved effect pigment orientation is measured as a change in lightness value as a function of viewing and/or illumination geometry. As a result, compared to the prior art, cured coatings according to the invention illustrate an unexpectedly large degree of change in their lightness values as a function of the viewing and/or illuminating geometry. Cured coatings according to the instant invention having at least one effect pigment (C) will generally exhibit an MF-D greater than or equal to 60 and preferably greater than 70, as measured on a multi-geometry spectrophotometer capable of measuring a lightness value at 25° off specular (L@25°) and a lightness value at 70° off specular (L@70°), with a $D_{65}$ illuminant source and a 10 degree standard observer per ASTM #-308-96, wherein ME-D=[((L@25°)−(L@70°))/(L@70°)]×50.

Compositions of the present invention can also reduce the need for organic solvents, and can also impart to coating compositions the ability to spray apply at high viscosities while still maintaining good flow and appearance characteristics.

The present invention provides coatings having a good combination of properties such as durability, hardness, and resistance to scratching, marring, solvents, and acids. Coating compositions according to the invention can also provide low VOC levels while maintaining other beneficial properties that are often found in coating compositions containing relatively high amounts of solvent, such as good sag resistance, leveling, low orange peel, gloss, DOI, wetting of the substrate, and pigment dispersing and loading, and uniform cure.

DESCRIPTION OF THE PREFERRED EMBODIMENTS

According to the invention, a curable coating composition having improved effect pigment orientation comprises (A) a carbamate-functional component having a hydrophobicity equivalent to or greater than that of a carbamate functional compound (A') that is the reaction product of (1) a compound comprising a plurality of hydroxyl groups, at least one of which is the result of a ring-opening reaction between an epoxy group and an organic acid group, and (2) cyanic acid or a compound comprising a carbamate group; (B) a component comprising a plurality of groups that are reactive with the carbamate functional groups on component (A); and (C) at least one effect pigment; the curable coating composition when cured having a substantially improved effect pigment orientation.

While not wishing to be bound to a particular theory, it is believed that carbamate-functional component (A) having a particular hydrophobicity and effect pigment (C) have a positive interaction that contributes to the unexpected improvement in effect pigment orientation. It has been theorized that the hydrophobicity of the carbamate-functional component (A) acts to prevent the destabilization of the individual effect pigment particles (C) during both manufacture and application of the curable coating composition. Finally, upon cure, the rapid rate of reaction between components (A) and (B) is believed to have the affect of "freezing" the effect pigment particles (C) into a desireable orientation before any disordering or destabilization can occur.

Component (A) of the invention will thus be a carbamate functional compound having a particular hydrophobicity. Ideally, component (A)—s hydrophobicity will correspond to the hydrophobicity of the effect pigment (C) and more particularly to the surface treatment, lubricant and/or paste carrier(s) of the one or more effect pigments (C).

It has been found that a preferred hydrophobicity is that which is equivalent to or greater than that of a carbamate functional compound (A') which is the reaction product of (1) a compound comprising a plurality of hydroxyl groups, at least one of which is the result of a ring-opening reaction between an epoxy group and an organic acid group, and (2) cyanic acid or a compound comprising a carbamate group. It will be appreciated that the hydrophobicity of compounds like surfactants is typically measured as HLB or hydrophobic/lipophilic balance. A suitable HLB for component (A) will thus be the HLB of compound (A').

According to the invention, carbamate-functional compound (A') is the reaction product of compound (A')(1) and component (A')(2). Most preferably, component (A) will be compound (A').

Compound (A')(1) comprises a plurality of hydroxyl groups at least one of which is the result of a ring opening reaction between an epoxy group and an organic acid group. Compound (A')(1) can be prepared in a variety of ways, such as by reacting of a monoepoxide with a hydroxy acid, reacting a monoepoxide with a polyacid, reacting a polyepoxide with a monoacid, reacting a polyepoxide with a hydroxy acid, or reacting a polyepoxide with a polyacid. Compound (A')(1)(a) will generally be the compound comprising the epoxy group while compound (A')(1)(b) will generally be the compound comprising the organic acid group.

Thus, compound (A')(1) may be the reaction product of (a) a compound comprising at least one epoxide group and (b) a compound comprising at least one organic acid group and at least one hydroxyl group. Alternatively, compound (A')(1) may be the reaction product of (a) a compound comprising at least one epoxide group and (b) a compound comprising a plurality of organic acid groups.

As indicated, the reaction between the epoxide compounds (a) and (b) is believed to be a ring-opening reaction between the epoxy group and the organic acid group. This reaction often utilizes carboxylic acid groups, although other organic acids such as phenolic compounds may be used as well. The acid/epoxy reaction is well-known in the chemical arts, and may proceed spontaneously at ambient conditions, either in solvent or neat, and may be advantageously accelerated with heat.

Compound (A')(1)(a) may be a monoepoxide or a polyepoxide. Virtually any epoxide may be used in the practice of the present invention. Epoxides are well-known in the art, and may be characterized by the general formula:

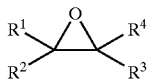

where $R^1$, $R^2$, $R^3$, and $R^4$ are each independently H (with the proviso that at least one of $R^1$–$R^4$ is other than H), an organic radical, which may be polymeric or non-polymeric and may contain unsaturation and/or heteroatoms, or one of $R^1$ or $R^2$ together with one of $R^3$ or $R^4$ may form a cyclic ring, which may contain unsaturation and/or heteroatoms.

Useful epoxides can be prepared from alcohols, e.g., butanol, trimethylol propane, by reaction with an epihalohydrin (e.g., epichlorohydrin), or by reaction of an allyl group with peroxide. The epoxide may be monofunctional or polyfunctional, which can be controlled by selection of the starting material. For example, a monoepoxide can be prepared by reacting a mono-alcohol or mono-acid with an epihalohydrin or a monounsaturate with peroxide, and a polyepoxide can be prepared by reacting a polyol (including diols, triols, and higher-functionality polyols) with an epihalohydrin or a polyunsaturate compound with peroxide. Oligomeric or polymeric polyepoxides, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Epoxides can also be prepared by reacting an isocyanate-terminated component such as a monomeric polyisocyanate (including isocyanurates, e.g., the isocyanurate of isophorone diisocyanate) or polymer or oligomer with glycidol. Other known polyepoxides, e.g., epoxy-novolacs, may also be used.

In one preferred embodiment, the epoxide is a monoepoxide, preferably an epoxy ester, also known as a glycidyl ester. Glycidyl esters can be prepared by reacting a monofunctional carboxylic acid (e.g., octanoic acid, benzoic acid, benzylic acid, cyclohexane carboxylic acid) with an epihalohydrin (e.g., epichlorohydrin) under conditions well-known in the art. Glycidyl esters are commercially available, e.g., as Cardura® E from Shell Oil Company, Glydexx® N-10 from Exxon, or Araldite® PT910 from Ciba-Geigy. Glycidyl esters may be described by the formula:

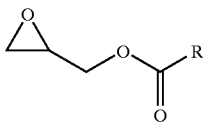

wherein R is a hydrocarbon group of from 1 to 40 carbon atoms, preferably 1–20 carbon atoms, and most preferably 1–12 carbon atoms. This hydrocarbon group may be substituted, as is known in the art. Polyglycidyl esters may also be used, and can be prepared by reacting a polyfunctional carboxylic acid (e.g., phthalic acid, thioglycolic acid, adipic acid) with an epihalohydrin. Polyglycidyl esters can also be described by the above formula where R is substituted with other glycidyl ester groups.

Another useful class of monoepoxides are glycidyl ethers. Glycidyl ethers can be prepared by the reaction of monofunctional alcohols (e.g., n-butanol, propanol, 2-ethyl hexanol, dodecanol, phenol, cresol, cyclohexanol, benzyl alcohol) with an epihalohydrin (e.g., epichlorohydrin). Useful glycidyl ethers include the glycidyl ether of 2-ethanol hexanol, the glycidyl ether of dodecanol, the glycidyl ether of phenol, and the like. These compounds are commercially available under the Erisys® product family from CVC Specialties. Polyglycidyl ethers may also be used, and can be prepared by reacting a polyfunctional alcohol (e.g., bisphenol A, 1,6-hexane diol) with an epihalohydrin.

Epoxides may also be prepared by reacting a compound containing one or more double bonds with peroxide or peracetic acid under conditions well-known in the art. Virtually any double bond-containing compound may be used. One useful class of double bond-containing compounds are cycloaliphatic monounsaturated compounds such as

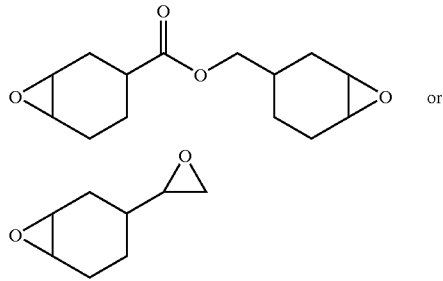 or which may be sold as the Cyracure® products from Union Carbide. Other double bond-containing compounds that may be used in the practice of the invention include ethylene, propylene, styrene, styrene oxide, cyclohexene, polybutadiene, and the like.

The epoxide may also be an acrylic-containing polymer or oligomer, preferably deriving its epoxy groups from glycidyl methacrylate monomer, glycidyl acrylate, allyl glycidyl ether, cyclohexyl monoepoxyy methacrylate, the epoxide of the dimer of cylopentadiene methacrylate, or epoxidized butadiene, more preferably glycidyl methacrylate.

The above-described epoxides are reacted with a compound (b) containing an organic acid to open the oxirane ring on the expoxide of compound (A')(1)(a). Preferably, a monoepoxide should be reacted with a hydroxy acid or a polyacid in order to result in a compound having a plurality of hydroxyl groups available for transesterification with the carbamate compound (A')(2). Alternatively, a compound having hydroxyl and epoxy groups (e.g., glycidol) can be reacted with a monoacid (or a polyacid) to result in a compound having a plurality of hydroxyl groups available for transesterification with the carbamate compound (A')(2).

Useful hydroxy acids include dimethylol propionic acid, hydroxy pivalic acid, malic acid, tartaric acid, and citric acid. When hydroxy acids are used, the reaction is preferably conducted without catalyst so that unwanted reaction of the hydroxyl groups with the epoxy groups is minimized.

Useful polyacids include tricarballylic acid, adipic acid, azeleic acid, trimellitic anhydride, citric acid, malic acid, tartaric acid, bisphenol F, and bisphenol A.

A polyepoxide may also be reacted with a hydroxy acid or a polyacid, although in the case of the polyacid/polyepoxide reaction, the starting materials and reaction conditions should be controlled so as to avoid any unwanted chain extension or branching, which could result in high molecular weight compounds that could increase VOC or cause gelation. Polyepoxides can also be reacted with monofunctional acids such as benzoic acid, pivalic acid, octanoic acid, Versatic® acid, butyric acid, dodecanoic acid, or benzophenol.

The compound (A')(1) is reacted with a compound (A')(2) to form the carbamate-functional compound (A'). In one embodiment, (A')(2) is cyanic acid, which may be formed by the well-known reaction of the thermal decomposition of urea or by other methods, such as described in U.S. Pat. Nos. 4,389,386 or 4,364,913: In another embodiment, (A')(2) is a compound comprising a carbamate group. In this embodiment, the reaction between (A')(1) and (A')(2) is believed to be a transesterification between the OH groups on (A')(1) and the carbamate ester on compound (A')(2). The carbamate compound (A')(2) can be any compound having a carbamate group capable of undergoing a transesterification with the hydroxyl groups on component (A')(1). These include, for example, methyl carbamate, butyl carbamate, propyl carbamate, 2-ethylhexyl carbamate, cyclohexyl carbamate, phenyl carbamate, hydroxypropyl carbamate, hydroxyethyl carbamate, and the like. Useful carbamate compounds can be characterized by the formula:

R'—O—(C=O)—NHR"

wherein R' is substituted or unsubstituted alkyl (preferably of 1–8 carbon atoms) and R" is H, substituted or unsubstituted alkyl preferably of 1–8 carbon atoms, substituted or unsubstituted cycloalkyl (preferably of 6–10 carbon atoms), or substituted or unsubstituted aryl (preferably of 6–10 carbon atoms). Preferably, R" is H.

The transesterification reaction between compounds (A') (1) and (A')(2) can be conducted under typical transesterification conditions, e.g., temperatures from room temperature to 150° C. with transesterification catalysts such as calcium octoate, metal hydroxides (e.g., KOH), Group I or II metals (e.g., Na, Li), metal carbonates (e.g., $K_2CO_3$) which may be enhanced by use in combination with crown ethers, metal oxides (e.g., dibutyltin oxide), metal alkoxides (e.g., $NaOCH_3$, $Al(OC_3H_7)_3$), metal esters (e.g., stannous octoate, calcium octoate, or protic acids (e.g., $H_2SO_4$), $MgCO_3$, or $Ph_4SbI$. The reaction may also be conducted at room temperature with a polymer-supported catalyst such as Amberlyst-15® (Rohm & Haas) as described by R. An and, Synhetic Communications, 24(19), 2743–47 (1994), the disclosure of which is incorporated herein by reference.

The ring-opening of the oxirane ring of an epoxide compound by a carboxylic acid results in a hydroxy ester structure. Subsequent transesterification of the hydroxyl group on this structure by the carbamate compound (A')(2) results in a carbamate-functional component that can be represented by either of the structures:

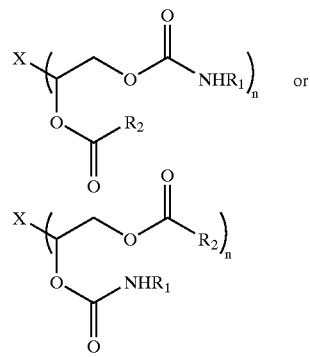

or a combination thereof, wherein n is a positive integer of at least 1, $R_1$ represents H, alkyl, or cycloalkyl, and $R_2$ represents alkyl, aryl, or cycloalkyl, and X represents an organic radical that is a residue of the epoxide compound. As used herein, it should be understood that these alkyl, aryl, or cycloalkyl groups may be substituted. For example, where a monoepoxide is reacted with a polyacid, $R_2$ in the above structures would represent the residue of the polyacid, and would be substituted with other carbamate group(s) resulting from the other acid groups on the polyacid reacting with the monoepoxide followed by transesterification with the carbamate compound (A')(2).

The composition of the invention is cured by a reaction of the carbamate-functional compound (A) with a component (B) that is a compound having a plurality of functional groups that are reactive with the carbamate groups on component (A). Such reactive groups include active methylol or methylalkoxy groups on aminoplast crosslinking agents or on other compounds such as phenol/formaldehyde adducts, siloxane or silane groups, and anhydride groups. Examples of (B) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), N-methylol acrylamide emulsions, isobutoxy methyl acrylamide emulsions, polyanhydrides (e.g., polysuccinic anhydride), and siloxanes or silanes (e.g., dimethyldimethoxy silane). Aminoplast resin such as melamine formaldehyde resin or urea formaldehyde resin are especially preferred. Also useful are aminoplast resins where one or more of the amino nitrogens is substituted with a carbamate group for use in a process with a curing temperature below 150° C., as described in U.S. Pat. No. 5,300,328.

The compositions of the invention will also comprise at least one effect pigment (C). The term "effect pigment" refers to inorganic and/or organic pigments used in a curable coating composition to produce an appearance or effect in the cured coating composition. Such pigments may also be described as gonioapparent pigments, ie pigments having a change in appearance with change in illumination angle or viewing angle per ASTM 284. Illustrative effects and/or appearances achieved with the use of such pigments may be described as metallic effects, including aluminum, silver, copper, bronze and gold; iridescence; pearlescence; luminescence, sparkle, dazzle, hammertone finishes, and/or increased depth of color. Illustrative examples of particular effects pigments are the metallic pigments such as aluminum pigments and bronze pigments; hydrated aluminum silicates such as mica; optically variable pigments, holographic pigments; and variations of the foregoing having pigment coatings thereon to provide light interference and/or absorbance properties. Those skilled in the art will appreciate that suitable effect pigments may have both reflective and transmissive properties.

Effect pigments (C) will generally and most preferably be in the form of a flake.

Particle sizes of from 100 to $2\mu$ are suitable. Particle sizes of from 50 to $5\mu$ are preferred.

Preferred effect pigments (C) are the metallic pigments. Preferred metallic pigments are aluminum pigments. Aluminum pigments are available in paste and powder forms and in leafing or nonleafing types. Paste and nonleafing versions of aluminum pigments are preferred. Aluminum pigment pastes containing hydrophobic solvents or media such as aliphatic hydrocarbons are most preferred. Aluminum pigments will generally and most preferably comprise surface treatments and/or lubricants. Both inorganic and organic surface treatments/lubricants are suitable. Illustrative examples include chromated aluminums, phophate pasitivation treatments, fatty amines and fatty acids. Most preferred are unsaturated fatty acids such as stearic acid. Suitable commercially available aluminum pigments are L-1526AR, SS-P354, SS-5742 and SS-524-AR from Silberline located in Tamaqua, Pa. Other suitable aluminum pigments are STAPA UP 46 432/G and UP 477 40/G from Eckart Aluminum of Germany.

The at least one effect pigment (C) may be used alone or with other effect pigments. The at least one effect pigment (C) or a combination thereof may also be used in combination with other pigments. Other pigments may be any organic or inorganic compounds or colored materials, extenders, fillers and other materials of kind that the art normally names as pigments. Color imparting pigments are most preferred for use as other pigments in combination with one or more effect pigments (C). Such pigments include white pigments; yellow, orange, and red inorganic pigments; black pigments; and organic pigments such as phthalocyanine pigments, thioindogo derivatives, anthraquinone pigments,quinacridone pigments, dioxazine pigments, isoindolinone pigments; all of which may be in a substituted, unsubstituted, or dimer form, and all other such color imparting pigments known to those skilled in the art.

The curable coating compositions of the invention will typically contain the at least one effect pigment (C) in an amount of from 2% to 200% based on the total nonvolatile weight of components (A) and (B) and any other binder components, i.e., a P:B ration of 0.02 to 2.0. Preferably, at least one effect pigment (C) should be present in an amount of from 10 to 50% and most preferably 15 to 35%, all %'s based on the total nonvolatile weight of the binder components. The foregoing ranges will also apply if at least one effect pigment (C) is used in combination with other effect pigments (C). If one or more effect pigments (C) are used in combination with other pigments as described above, the curable coating compositions of the invention will generally comprise from 2 to 350% by weight other pigments and from 2 to 50% one or more effect pigments (C) and preferably from 2 to 100% other pigments and 2 to 35% one or more effect pigments (C), all %s based on the total nonvolatile weight of components (A) and (B) and any other binder components.

Preferably, the curable coating composition of the invention will further comprise a rheology control agent (D). The term rheology control agent refers to organic or inorganic agents known to affect the rheology of a coating composition. Typically, such agents are used to provide sag and flow control. Illustrative examples of suitable rheology control agents are cellulose acetate butyrate, castor oil derivatives, calcium sulfonate gels, organo-modified clays, diurea crystals per Netherlands patents 7,316,870 and 7,316,873, silicas, taics, the acrylic microgel resins described in U.S. Pat. No. 4,377,661, the entire disclosure of which is incorporated herein by reference, and polymer microparticles such as those described in U.S. Pat. No. 4, 220,679, the entire disclosure of which is incorporated herein by reference. Preferred rheology control agents are CABs, the foregoing acrylic microgel resins and the foregoing polymer microparticles, or combinations thereof. A particularly preferred rheology control agent is a mixture of the foregoing acrylic microgel resin and polymer microparticles.

Rheology control agent (D) may be present in amount of from 0% to 25% by weight based on the weight of nonvolatile binder components such as (A) and (B). Preferably, rheology control agent (D) will be present in an amount of from 5 to 20% and more preferably from 7 to 15%, all %s by weight based on the total amount of nonvolatile binder components.

A solvent may optionally be utilized in the coating composition used in the practice of the present invention. The coating composition according to the present invention can be applied without solvent, especially if the degree of chain extension for component (A) is limited. However, in many cases, it is desirable to use a solvent in the coating composition as well. This solvent should act as a solvent with respect to both the carbamate-functional compound (A) as well as the component (B). In general, depending on the solubility characteristics of components (A) and (13), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, amyl acetate, ethylene glycol butyl ether-acetate, propylene glycol monomethyl ether acetate, xylene, N-methylpyrrolidone, or blends of aromatic hydrocarbons. In another embodiment, the solvent can be water or a mixture of water with co-solvents.

The coating composition used in the practice of the invention may include a catalyst to enhance the cure reaction. For example, when aminoplast compounds, especially monomeric melamines, are used as component (13), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

Although a solvent may be present in the coating composition in an amount of from about 0.01 weight percent to about 99 weight percent, it is preferably present in an amount of less than 30%, more preferably less than 20% and most preferably less than 10%. The coating composition preferably has a VOC (VOC is defined herein as VOC according to ASTM D3960) of less than 3.8 lbs/gal, more preferably less than 3.0 lbs/gal, even more preferably less than 2.0 lbs/gal, and most preferably less than 1.0 lbs/gal. Curable coating compositions having one or more effect pigments (C) wll most preferably have a VOC of 3.5 or less and most preferably between 3.0 and 2.0 lbs/gal.

The curable coating compositions of the invention may be prepared by combining the desired components under a source of mild agitation such as a paddle mixer blade. The components may be added in any order of addition but it is preferred that the one or more effect pigments (C) be incorporated into solvent and/or a resinous component to form a slurry. Remaining components such as additional and/or other resinous components, catalysts, additives, rheology control agents, solvents, and/or other pigment pastes can be subsequently added. Most preferably, some or all of one or more effect pigment (C) will be contacted with some portion of the total amount of component (A) prior to contact with component (B). This may be done by using some portion of component (A) to form the slurry with one or more effect pigments (C). Preferably from 10 to 50% by weight of (A) will be added to the slurry, based on the total weight of (A) in the curable coating composition.

The curable coating compositions can be coated on an article by any of a number of techniques well-known in the art. These include, for example, spray coating, dip coating, roll coating, curtain coating, and the like. For automotive body panels, spray coating is preferred. One advantage that can be achieved with coating compositions according to the invention is that coatings with a high degree of flexibility can be prepared. Accordingly, in one preferred embodiment, the substrate onto which the coating is applied is flexible, such as plastic, leather, or textile substrates. In another embodiment, previously prepared metal substrates are preferred, particularly such substrates having one or more surface preparation coatings such as electrodeposition coatings, primers and/or sealers.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

In one preferred embodiment, the coating composition according to the invention is preferably utilized in a high-gloss coating and/or as the clearcoat of a composite color-plus-clear coating. High-gloss coatings as used herein are coatings having a 200 gloss (ASTM D523-89) or a DOI (ASTM E430-91) of at least 80. In other preferred embodiments, the coating composition may be utilized to prepare high-gloss or low-gloss primer or enamel coatings.

When the curable coating compositions of the invention is used as a basecoat in a composite color-plus-clear coating, the clearcoat may be those such as are known to those skilled in the art. Preferably, the clearcoat will be a curable coating composition comprising a carbamate functional polymer according to the instant invention or those such as disclosed in U.S. Pat. No. 5,474,811 the disclosure of which is incorporated by reference. Other polymers known in the art to be useful in clearcoat compositions include acrylics, polyurethanes, polyesters, epoxy and combinations thereof. Preferred polymers include the foregoing carbanate functional polymers, acrylics and polyurethanes. In one preferred embodiment of the invention, the clearcoat composition utilizes a carbamate-functional acrylic polymer. Clearcoat polymers are preferably crosslinkable, and thus comprise one or more of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Clearcoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

Suitable clearcoat compositions may be waterborne or solventborne with solvent borne preferred.

When the coating composition according to the invention is used as the clearcoat of a composite color-plus-clear coating, the pigmented basecoat composition may any of a number of types well-known in the art, and does not require explanation in detail herein. Polymers known in the art to be usefull in basecoat compositions include acrylics, vinyls, polyurethanes, polycarbonates, polyesters, alkyl, and siloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-crosslinkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The coating composition according to the present invention is curable even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

In a number of embodiments of the present invention, the curable coating composition, when cured, can result in coatings having a surprising combination of high cross-link density without becoming brittle. As used herein, crosslink density is determined as described in the "Paint and Coatings Testing Manual", *Gardner-Sward Handbook*, 14th ed., chapt. 46, p. 534, ASTM, 1995. Crosslink density is expressed in moles/cm$^3$ and is calculated using the formula $$v_e = \frac{G'}{RT} = \frac{E'}{3RT}$$

where $v_e$=moles of elastically effective network chains per cubic centimeter of film, the storage modulus values, G' or E', are obtained in the rubbery plateau, T is temperature in degrees K corresponding to the storage modulus value, and R is the gas constant (8.314×10$^7$ dynes/deg. K·mole). Thus, one embodiment of the invention is directed toward a cured coating derived from the above-described curable coating compositions, which as a cross-link density of at least 3, and preferably at least 10.

The invention is further described in the following examples.

Preparation A

In the first step, 89 parts of citric acid, a 25% aliquot of the stoichiometric ratio, was charged with 1470 parts of Glydexx®V N-10 glycidyl neodecanoate to a reaction vessel. The mixture was heated to a temperature of 128° C. After a slight exotherm, three more 25% increments of 89 parts of the citric acid were added spaced over a 4-hour period and the temperature was maintained at 130° C. The reaction was monitored via acid number to a value of <3 and contained no residual epoxy groups.

In step two, 840 parts of methyl carbamate, a 50% excess, was added along with 12.8 parts of dibutyltin oxide catalyst and 1200 parts of toluene. A reflux temperature of 109–117° C. was maintained for 32 hours as methanol was trapped off. The progress of the reaction was monitored by hydroxyl number to at least 95% completion. The excess methyl carbamate and solvent were stripped off and 425 parts of amyl acetate was added to reduce to a non-volatile content of 80%.

EXAMPLE 1

A curable coating composition according to the invention was prepared as Coating I using the formulation below and the product of preparation A above. A standard acrylic silver basecoat composition was prepared as Coating II using the formulation below.

| | % Wt NV | COATING I total wgt (gm) | COATING II total wgt (gm) |
|---|---|---|---|
| Aluminum A[1] | 70 | 3.58 | 3.58 |
| Aluminum B[2] | 64 | 2.09 | 2.09 |

[1] L-15626AR Sparkle Silver Aluminum Paste available from Silberline Manufacturing Co. of Tamaqua, PA.

| | | | |
|---|---|---|---|
| Acrylic Polymer[3] | 75 | | 41.4 |
| Product A | 80 | 38.87 | — |
| Melamine[4] | 100 | 5.47 | 5.47 |
| RCA 1[5] | 31 | 18.43 | 18.43 |
| RCA 2[6] | 41 | 11.6 | 11.6 |
| Catalyst[7] | 25 | 1.9 | 1.9 |
| Solvent 1[8] | | 3.0 | 3.0 |
| Solvent 2[9] | | 3.0 | 3.0 |
| Solvent 3[10] | | 14.51 | 21.83 |

[2] SS-5242-AR Sparkle Siler Aluminum Paste available from Silberline Manufacturing Co. of Tamaqua, PA.
[3] A flexible acrylic resin based on acrylic acid, ethylhexyl acrylate, hydroxyethyl acrylate, butylmethacrylate, and caprolactone monomers.
[4] Hexamethoxy methyl Melamine commercially available from Solutia of Springfield, MA as Resimene 747.
[5] Emulsion Microgel per U.S. Pat. No. 4,377,661
[6] Polymer Microparticles per U.S. Pat. No. 4,220,679.
[7] DDBSA commercially available from King Industriesof Norwalk, CT. as Nacure ™ 5076.
[8] Oxo-hexyl acetate
[9] n-methylpyrrolidone
[10] n-butyl acetate The compositions were prepared by first preparing a slurry of the aluminum pigments with the required resin and solvent 3. The remaining components were then added to the slurry.

Each coating was reduced with n-butyl acetate to a viscosity of 18 seconds on a #4 Ford cup. Coating I had a % nonvolatile of 50.1% while Coating II had a % nonvolatile and was spray applied at a 0.7 mil film build over electrodeposition primed 032 gauge steel panels. After a 2 minute ambient flash, the panels were coated with a 2 mils of BASF Corporation's E126CE012A, a standard 1-component high solids melamine crosslinked acrylic clearcoat. After a 10 minute ambient flash the panels were baked 30 minutes at 250° F. in a gas fired convection oven.

The change in lightness value as a function of the viewing and/or illuminating geometry was evaluated as follows. The panels prepared above were evaulated on a gonio or multi-geometry spectrophotometer manufactured by Zeiss of Oberkochen, Germany, model #MMK-11. A $D_{65}$ illuminant source and a 10 degree standard observer was used per ASTM E-308-96. The amount of "travel" or metallic flop correlates to the MF-D value below. MF-D is calculated as follows:

$$MF\text{-}D=[((L@25°)-(L@70°))/(L@70°)]\times 50$$

where L is the lightness value of the panel measured at the specified angle. It will be appreciated that the MF-D value will be higher as the difference between L@25 and L@70 increases. Thus, higher MF-D values are desirable and are an indication of improved orientation and appearance of a curable coating composition having an effect pigment. It can be seen from the table below that Coating I exhibits a measurable improvement over the control panel of Coating II.

| Coating # | L @ 20° MF-D | L @ 25° MF-H | L @ 45° MF-I | L @ 70° | L @ 110° |
|---|---|---|---|---|---|
| Coating I | 117.8 | 105.6 | 57.5 | 37.8 | 374 |
| | 89.7 | 118.0 | 140.0 | | |
| Coating II | 109.3 | 101.4 | 68.0 | 49.2 | 48.4 |
| | 53.1 | 76.8 | 89.6 | | |

The invention has been described in detail with reference to preferred embodiments thereof It should be understood, however, that variations and modifications can be made within the spirit and scope of the invention.

What is claimed is:

1. A curable coating composition having substantially improved effect pigment orientation, comprising
   (A) a carbamate-functional component which is the reaction product of:
      (1) a compound comprising a plurality of hydroxyl groups, at least one of which is the result of a ring-opening reaction between an epoxy group and an organic acid group, and
      (2) cyanic acid or a compound comprising a carbamate group,
   (B) a component comprising a plurality of groups that are reactive with the carbamate functional groups on component (A), and
   (C) at least one effect pigment, the curable coating composition when cured having a substantially improved effect pigment orientation.

2. The curable coating composition of claim 1 wherein the substantially improved effect pigment orientation is measured as a change in lightness value as a function of viewing and/or illumination geometry.

3. The curable coating composition of claim 2 having an MF-D greater than or equal to 60 as measured on a multi-geometry spectrophotometer capable of measuring a lightless value at 25° off specular (L@25°) and a lightness value at 70° off specular (L@70°), with a $D_{65}$ illuminant source and a 10 degree standard, observer per ASTM #-308-96, wherein MF-D=[((L@25°)−(L@70°))/(L@70°)]×50.

4. The curable coating composition of claim 3 having an MF-D greater than or equal to 70 as measured on a multi-geometry spectrophotometer cap able of measuring a lightness value at 25° off specular (L@25°) and a lightness value at 70° off specular (L@70°), with a $D_{65}$ illuminant source and a 10 degree standard observer per ASTM #-308-96, wherein MF-D=[((L@25°)−(L@70°))/(L@70°)]×50.

5. The curable coating composition of claim 1 wherein carbamate-functional component (A) is the reaction product of
   (1) a compound having a plurality of hydroxyl groups that is the reaction product of:
      (a) a compound comprising at least one epoxide group, and
      (b) a compound comprising at least one organic acid group and at test one hydroxyl group, and
   (2) cyanic acid or a compound comprising a carbamate group.

6. The curable coating composition of claim 1 wherein carbamate-functional component (A) is the reaction product of
   (1) a compound having a plurality of hydroxyl groups that is the reaction product of:
      (a) a compound comprising at least one epoxide group and
      (b) a compound comprising a plurality of organic acid groups, and
   (2) cyanic acid or a compound comprising a carbamate group.

7. The curable coating composition according to claim 1 wherein said carbamate-functional component is represented by either of the structures:

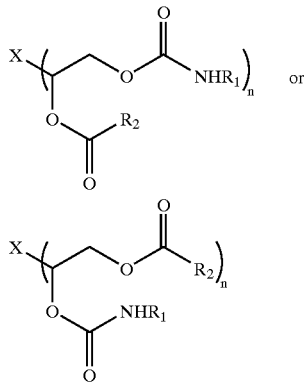

or a combination thereof, wherein
   n is a positive integer of at least 1,
   $R_1$ represents H, alkyl or cycloalkyl,
   $R_2$ represents alkyl, aryl, or cycloalkyl, and
   X represents an organic radical.

8. The curable coating composition of claim 1 wherein component (B) is an aminoplast resin.

9. The curable coating composition of claim 1 wherein at least one effect pigment (C) is selected from the group consisting of metallic pigments, mica and mixtures thereof.

10. The curable coating composition of claim 1 having a VOC of less than 3.5 lbs/gal.

11. A method for obtaining a coated surface having improved effect pigment orientation, comprising
    providing at least one effect pigment (C),
    providing a carbamate-functional component (A) which is the reaction product of:
       (1) a compound comprising a plurality of hydroxyl groups, at least one of which is the result of a ring-opening reaction between an epoxy group air organic acid group, and
       (2) cyanic acid or a compound comprising a carbamate group,
    providing a component (B) comprising a plurality of groups that are reactive with the carbamate functional groups on component (A),
    mixing components (A), (B) and (C) so as to provide a curable coating composition (I),
    coating a surface with tile curable coating composition (1), and
    exposing the coated surface to heat for a time sufficient to care the coating composition (I) to provide a cured coated surface.

12. The method of claim 11 wherein carbamate-functional component (A) and the at least one effect pigment (C) are mixed together prior to the incorporation of component (B).

13. The method of claim 11 wherein the carbamate-functional component (A) is represented by either of the structures:

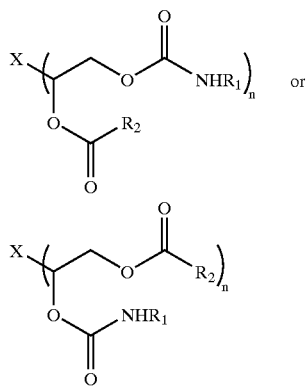

or a combination thereof, wherein
   n is a positive integer of at least 1,
   $R_1$ represents H, alkyl, or cycloalkyl,
   $R_2$ represents alkyl, aryl, or cycloalkyl, and
   X represents an organic radical.

* * * * *

UNITED STATES PATENT AND TRADEMARK OFFICE
CERTIFICATE OF CORRECTION

PATENT NO. : 6,420,472 B1
DATED : July 16, 2002
INVENTOR(S) : Rehfuss et al.

It is certified that error appears in the above-identified patent and that said Letters Patent is hereby corrected as shown below:

Column 14,
Line 66, after "measuring a" and before "value", please delete "lightless" and insert -- lightness --;

Column 15,
Line 7, after "spectrophotometer", and before "of measuring", please delete "cap able", and insert -- capable --;
Line 20, after "and at" and before "one hydroxyl", please delete "test", and insert -- least --;

Column 16,
Line 13, after "epoxy group" and before "organic acid", please delete "air" and insert -- and an --.

Signed and Sealed this

Twelfth Day of November, 2002

Attest:

Attesting Officer

JAMES E. ROGAN
*Director of the United States Patent and Trademark Office*